3,505,364
17α-CYANOETHYNYL STEROIDS
Werner Mehrhof, Klaus Irmscher, Hans-Gunther Kraft, and Hartmut Kieser, Darmstadt, Germany, assignors to E. Merck A.G., Darmstadt, Germany
No Drawing. Filed Sept. 25, 1967, Ser. No. 670,410
Claims priority, application Germany, Sept. 26, 1966, M 71,056
Int. Cl. C07c *169/10;* A61k *17/00*
U.S. Cl. 260—397.4            6 Claims

ABSTRACT OF THE DISCLOSURE

17α-cyanoethynyl androstane derivatives possessing female sex hormone activities.

---

Applicants hereby claim the benefit of the filing date of German patent application Ser. No. M 71,056 of Sept. 26, 1966, pursuant to the provisions of 35 U.S.C. 119.

This invention relates to 17α-cyanoethynyl steroids.

Objects of this invention include the provision of novel chemical compounds, as well as processes and intermediates for the production of such compounds. Further objects include pharmaceutical compositions, and methods of effecting steroidal activities in mammals.

Upon further study of the specification and claims, other objects and advantages of the present invention will become apparent.

To attain the above objects of this invention, there are provided 17α-cyanoethynyl compounds of Formula I, as follows:

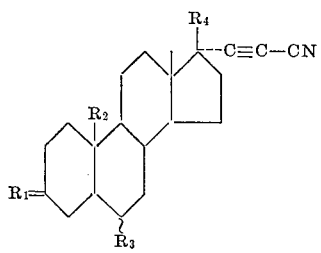

(I)

wherein:

$R_1$ represents

or a free or functionally modified keto group;

$R_2$ and $R_3$, being the same or different, represent H or $CH_3$;

$R_4$ is a free, esterified, or etherified OH-group; and $R_5$ represents H or a free, esterified, or etherified OH-group;

and mono and polydehydro derivatives thereof.

These steroids possess valuable pharmacological properties and can therefore be employed as medicines. In particular, in those compounds wherein ring A is non-aromatic, there are observed progestational, pregnancy-sustaining, anti-estrogenic, ovulation-inhibiting, and anti-androgenic effects. The substances wherein ring A is aromatic exhibit estrogenic, anti-fertility, ovulation-inhibiting and cholesterol-level lowering effects; they are suitable for therapy of climacteric disorders.

Some compounds, such as 17α-cyanoethynyl-estradiol and its 3-methyl ether (3-methoxy-17α-cyanoethynyl-1,3,5(10)-estratrien-17β-ol) exhibit a favorable ratio of a relatively high cholesterol-level-lowering effect and a relatively low estrogenic effect; this makes them suitable for therapy of disorders characterized by a high level of cholesterol without simultaneously showing hormonal side effects which may be undesirable in certain cases.

17α-cyanoethynyl-19-nor-testosterone shows particularly favorable ovulation-inhibiting properties.

By converting the cyanoethynyl moiety of the steroids of this invention, there can be produced known steroids of known utilities. For example, the 17α-cyanoethynyl-steroids of the invention may be transformed by conventional hydrolysis into the corresponding 17α-carboxy-ethynyl-steroids.

These, in turn, can be hydrogenated to yield 17-spirolactones such as 17α-(2-carboxyethyl)-17β-hydroxy-4-androsten-3-one-lactone which are known to be valuable aldosterone-antagonists. Alternatively, the 17α-carboxyethynylsteroids can be reduced with lithium aluminum hydried to yield the corresponding 17α-(3-hydroxy-1-propinyl)-steroids which partly (such as 17α-(3-hydroxy-1-propinyl)-5-androstene-3β,17β-diol) are pituitary inhibitors (cf. U.S. Patent 3,113,953) and the esters of which (such as the 2-phenylpropionate of 3-methoxy-17α-(3-hydroxy-1-propinyl)-1,3,5(10)-estratrien-17β-ol) lower the cholesterol level. Furthermore, the tosylates, of the 17α-(3-hydroxy-1-propinyl)-steroids, on treatment with lithium aluminum hydride, yield 17α-propargyl-steroids such as 17α-propargyl-19-nor-testosterone which have progestational properties.

For producing the 17α-cyanoethynyl steroids of Formula I, several processes can be used, for example:

(A) A steroid of Formula II, as well as mono and polydehydro derivatives thereof:

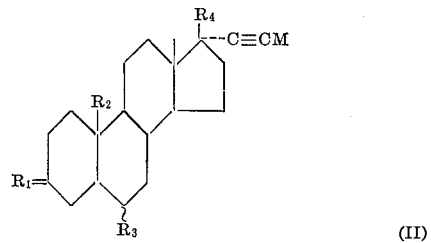

(II)

wherein:

$R_1$ to $R_4$ have the above-indicated meanings; and

M is a metal atom, such as a lithium, sodium, potassium, or silver atom, an equivalent of a mercury atom, or the group MgX (X being Cl, Br or I), is reacted with a compound of Formula III:

$$Y—C≡N \qquad (III)$$

wherein Y represents either CN or a residue negative with respect to the cyano group, such as, for example, aryloxy or X as defined above;

(B) A ketone of Formula IV, or a mono or polyde-hydro derivative thereof:

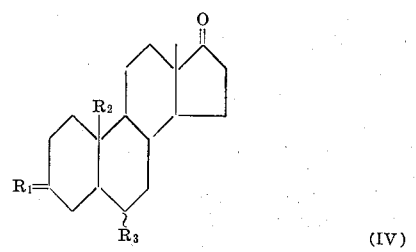

(IV)

wherein $R_1$, $R_2$ and $R_3$ have the above-indicated meanings, is reacted with an anion of an acetylene derivative of Formula V:

$$^⊖C≡C—Z$$

wherein Z represents either CN or a residue convertible into a CN-group, and in the latter case subsequently converting group Z into a nitrile group by conventional methods; and (C) In a compound of Formula I, conventionally liberating functionally modified hydroxy and/or keto groups, and/or esterifying or etherifying free hydroxy groups.

In Formula I, the residue $R_1$ represents $\alpha H\beta R_5$ or a free or a functionally modified keto group. Preferred functionally modified keto groups are, in particular, the ketals, especially the lower alkylene ketals such as ethylene ketals; the enolethers (e.g., lower alkyl enolethers, and cycloalkyl enolethers of 5 to 7 carbon atoms such as cyclopentyl enolether); the enolesters (e.g., enol(lower) alkanoates such as enolacetate); Schiff bases derived from hydrocarbon aliphatic amines of 1 to 6 carbon atoms or hydrocarbon aryl amines of 6 to 10 carbon atoms such as phenylamine; and the enamines (e.g., the pyrrolidine, piperidine, and morpholine enamines).

The residues $R_4$ and $R_5$ can represent, independently of each other, free, esterified, or etherified hydroxy groups of preferably up to 18 carbon atoms. Preferred ester residues are those derived from carboxylic acids, particularly the formate, acetate, propionate, butyrate, valerate, trimethylacetate, capronate, enanthate, caprylate, caprinate, laurate, palmitate, oleate, stearate, hemioxalate, hemi-succinate, benzoate, phenylacetate, 2-phenyl-propionate, 2-cyclo-pentyl-propionate, 2-cyclohexyl-propionate, and sulfoacetate. Also suitable are the corresponding phosphate and sulfate, as well as the salts of the above-mentioned acidic esters, particularly the sodium and ammonium salts.

Particularly suitable ethers are lower alkyl ethers of up to 4 carbon atoms, e.g., the methoxy, ethoxy, propoxy, iso-propoxy, and n-butoxy compounds, as well as tetrahydropyranyl-(2)-ethers, cyclopentyl ethers, and sulfomethoxy derivatives.

Residue $R_5$ can also represent hydrogen.

The compounds of Formulae I, II and IV can contain one or more but preferably not more than 5 double bonds. The double bonds are advantageously present in the 1(2)-; 2(3)-; 3(4)-; 4(5)-; 5(6)-; 5(10)-; 6(7)-; 9(10)-; 9(11)-; and/or 11(12)-position. Among the compounds containing several double bonds, particularly important groups are the 1,4- and 4,6-androstadiene derivatives; the 2,5(10)-, 4,6-, 4,9- and 5(10),9(11)-estradiene derivatives; the 1,4,6-androstatriene derivatives; and the 1,3,5(10)- and 4,9,11-estratriene derivatives.

Particularly preferred starting compounds of Formula II are the metallic derivatives of 17α-ethynyl-2-, -4- and -5-androstene-3β,17β-diol,
17α-ethynyl-4- and -5-androsten-3-on-17β-ol,
6α- and 6β-methyl-17α-ethynyl-4-androsten-3-on-17β-ol,
6-methyl-17α-ethynyl-4,6-androstadien-3-on-17β-ol,
17α-ethynyl-1,4- and -4,6-androstadien-3-on-17β-ol,
17α-ethynyl-4,6-androstadiene-3β,17β-diol,
17α-ethynyl-19-nor-4- and -5(10)-androstene-3β,17β-diol,
17α-ethynyl-19-nor-4- and -5(10)-androsten-3-on-17β-ol,
17α-ethynyl-19-nor-4-androsten-17β-ol, and
17α-ethynyl-estradiol, as well as the functional derivatives of these compounds, particularly the esters (e.g., acetates, propionates), tetrahydropyranyl-(2)-ethers, and methyl ethers, or the ketals, e.g., ethylene ketals, enolethers, and enolesters, e.g., the enolacetates.

The starting compounds of Formula II are either known or they can be readily produced analogously to known compounds. For example, these starting compounds can be obtained by reacting corresponding 17-keto compounds of Formula IV with metallic derivatives of acetylene. In this procedure, other reactive groups in the molecule must, in certain cases, be protected by an intermediate step.

Suitable compounds of Formula III are, in addition to cyanogen, cyanogen chloride, bromide and iodide. In addition, particularly good results are obtained with aryl cyanates, e.g., phenyl cyanate and derivatives thereof substituted in the phenyl ring, such as p-tolyl-, p-methoxyphenyl-, p-nitrophenyl-, and p-chlorophenyl-cyanate. (The cyanates have the formula Ar—O—CN.)

The reaction of II with III is suitably conducted in such a manner that first the basic 17α-ethynyl steroid (II, M=H) is dissolved in an inert solvent, for example, an ether, such as diethyl ether, tetrahydrofuran, or dioxane; a hydrocarbon, such as benzene or toluene; hexamethylphosphoric acid triamide; mixtures thereof; or in liquid ammonia, and then converted in a conventional manner, e.g., by the addition of phenyl magnesium bromide solution or lithium, into the metal derivative II. The compound of Formula III is introduced or added dropwise into the thus-obtained mixture, optionally diluted with one of the above-mentioned inert solvents or with dimethyl formamide, dimethyl sulfoxide, or acetone. The reaction is normally conducted at temperatures between $-80°$ C. and the boiling temperature of the solvent or solvent mixture employed, preferably between 0 and $100°$ C. Generally, the reaction is terminated after about 1–48 hours.

The 17α-cyanoethynyl steroids of Formula I can also be synthesized by reacting 17-keto-steroids of Formula IV with anions of Formula V. In Formula V, the residue Z represents a nitrile group or a residue convertible into such a group, preferably $CONH_2$, $COOR'$, or $CH(OR')_2$ (R' represents lower alkyl). Z can also represent tetrahydropyranyl-(2)-oxymethyl, for example. The anion V is accordingly derived preferably from propiolic acid nitrile, propiolic acid amide, a lower alkyl ester (e.g., the methyl or ethyl ester) of propiolic acid, or a lower propiolaldehydacetal (e.g., the dimethyl or diethyl acetal).

The starting compounds IV are either known, or they can be readily prepared analogously to known compounds. They can be produced, for example, by oxidizing the corresponding 17-hydroxy-steroids. Particularly preferred starting compounds IV are 2-, 4- and 5-androsten-3β-ol-17-one, 4- and 5-androstene-3,17-dione, 6α- and 6β-methyl-4-androstene-3,17-dione, 6-methyl-4,6-androstadiene-3,17-dione, 1,4- and 4,6-androstadiene-3,17-dione, 4,6-androstadiene-3β-ol-17-one, 19-nor-4- and -5(10)-androsten-3β-ol-17-one, 19-nor-4- and -5(10)androstene-3,17-dione, 19-nor-4-androsten-17-one, estrone, as well as the derivatives of these compounds functionally modified in the 3-position, particularly the 3-esters (e.g., acetates, propionates), 3-tetrahydropyranyl-(2)-ethers, and 3-methyl ethers of the compounds having a hydroxy group in the 3-position, as well as the 3-ketals, 3-enolethers, and 3-enolesters, e.g., the 3-enolacetates, of the above-mentioned 3,17-diketones.

The anion V can be obtained from the basic acetylene derivative by the effect of a strong base, the nucleophilicity of which is to be as low as possible. Suitable bases are, in particular, tertiary metal alcoholates, especially potassium-tert.-butylate, secondary metal alcoholates, and metal amides derived from secondary amines, particularly the corresponding potassium, sodium, and lithium derivatives. If Z=$CONH_2$ or, especially, Z=$CH(OR')_2$, the anion V can also be produced by the effect of metals, such as lithium, sodium or potassium, or conventional Grignard reactants, such as methyl or phenyl magnesium chloride, bromide, or iodide upon the basic acetylene derivative (propiolic acid amide or propiolaldehydacetal).

Anion V is preferably produced in situ. In this connection, it is particularly advantageous to dissolve the ketone of Formula IV together with the propiolic acid derivative in an inert solvent, and then to gradually mix the solution with the strong base, which latter can, in turn, be dispersed in an inert solvent. Preferred inert solvents are the tertiary and secondary alcohols on which the above-mentioned bases are based, such as tert.-butanol, tert.-amyl alcohol, isopropanol. Additional inert solvents include ethers, such as diethyl or diisopropyl ether, tetrahydrofuran, dioxane; hydrocarbons, such as benzene, toluene, or xylene; hexamethylphosphoric acid triamide, as well as mixtures of the above-mentioned solvents. The reaction is preferably conducted with cooling, namely at temperatures between about −80° C. and 100° C. Typically, a solvent or suspension of the base is added dropwise to the solution provided beforehand in such a manner that the reaction temperature does not exceed 0–5° C., and the reaction is terminated by stirring for several hours at the same temperature or at a slightly elevated temperature.

If the acetylene derivative employed is the propiolic acid amide, or a lower propiolic acid ester or a propiolaldehydeacetal then, in the thus-obtained intermediate products (I, $R_4$=OH; $CONH_2$, COOR' or $CH(OR')_2$ instead of CN), the amide or ester or acetal group must be converted thereafter into the nitrile group, any known technique being feasible, for example, as described in Journal of Organic Chemistry, volume 25, page 2135 (1960); volume 26, pages 1003 and 3356 (1961); volume 27, page 4372 (1962).

The ester group can be converted into the amide group, for example, by reaction with alcoholic or aqueous-alcoholic ammonia, and the amide group can be converted into the desired nitrile group by the effect of a dehydration agent, such as phosphorus oxychloride, phosphorus pentoxide, or acetic anhydride. Acetals are suitably first converted into the aldehydes (I, $R_4$=OH, CHO instead of CN) with acids (e.g., hydrochloric acid) in water miscible solvents (e.g., methanol, ethanol); these aldehydes can be converted, in one stage or in several stages, into the desired nitriles. The nitriles are obtained, for example, by reacting the aldehydes with N,O-bis-(trifluoroacetyl)-hydroxylamine, or trifluoro-acetohydroxamic acid in the presence of a base, such as pyridine, in an inert solvent, such as benzene or toluene, at temperatures between 0 and 100° C. Still another technique involves converting the aldehydes into the oximes with hydroxylamine (preferably in the form of the hydrochloride); the oximes can then be dehydrated to the nitriles, for example, with acetic anhydride, phosphorus pentoxide, or thionyl chloride, preferably under heating. It is also possible first to acylate the oximes; treating the acyloximes with bases likewise leads to the desired nitriles.

In a compound of Formula I, functionally modified hydroxy- and/or keto-groups can be liberated, if desired. A liberation of such hydroxy- and/or keto-groups is conducted by conventional methods known from the literature. For example, it is possible to hydrolyze the ester groups by the effect of strong acids, such as hydrochloric acid or sulfuric acid or, preferably, by the effect of bases, such as aqueous, aqueous-alcoholic, or alcoholic sodium or potassium hydroxide, or sodium or potassium carbonate, or sodium or potassium bicarbonate. Ether groups, particularly tetrahydropyranyl-(2)-ether-groups, can be split hydrolytically by the effect of mineral acids, such as hydrochloric acid or sulfuric acid. Similarly, blocked keto-groups are hydrolytically liberated; for example, keto-groups modified as the ketals are liberated by acid hydrolysis.

Compounds of Formula I having a free hydroxy group in the 3- and/or 17-position can, if desired, be esterified or etherified.

Esterification agents which can be employed are all of those acids, or the esterifiable derivatives thereof, resulting in physiologically compatible esters. For example, the following acids or the esterifiable derivatives thereof can be employed: carboxylic acids, such as acetic acid, propionic acid, butyric acid, valeric acid, isovaleric acid, trimethylacetic acid, caproic acid, enanthic acid, caprylic acid, palmitic acid, undecylenic acid, benzoic acid, hexahydrobenzoic acid, cyclopentylacetic, cyclohexylacetic, or arylacetic and propionic acids, such as phenylacetic acid or phenylpropionic acid, as well as halocarboxylic acids, such as chloroacetic acid, ether acids or heterocyclic acids, such as furancarboxylic acid-(2) or nicotinic acid.

If desired, it is also possible to conduct an esterification reaction, for the production of water-soluble derivatives, with dicarboxylic acids, amino-, or dialkylaminocarboxylic acids, or with phosphoric or sulfuric acid, or with derivatives thereof. In this manner, there can be produced, for example: oxalates, succinates, maleates, or the acid addition salts, particularly the hydrochlorides, of aminocarboxylic acid esters, such as, for example, aspartic acid esters or diethylaminoacetic acid esters. The compounds of Formula I containing an esterified hydroxy group also embrace the ester salts, for example, the sodium salts and the ammonium salts of the acidic oxalates, succinates, phosphates, and sulfates. The ammonium salts can be substituted, if desired, by lower alkyl radicals. Derivatives suitable for esterification are, in addition to the free acids, for example, the acyl halide thereof, the anhydrides thereof, the thiol derivatives thereof, as well as the ketenes. Lower alkyl esters are also suitable for transesterification methods.

An etherification of a free hydroxy group in the 3- and/or 17-position is suitably accomplished by reacting the compound with the corresponding alkyl halides or sulfonic acid esters, preferably with the iodides, in the presence of silver compounds, such as freshly precipitated silver oxide, silver hydroxide, or silver carbonate. Suitable halides are, in particular, methyl, ethyl, propyl, isopropyl, and n-butyl chloride, bromide, and iodide. Preferably, the reaction is conducted with an excess of the halide at room temperature or slightly higher temperature with stirring. An inert polar solvent is employed, such as formamide, dimethyl formamide, or dimethyl sulfoxide. Of course, for the etherification of the hydroxy group, all other conventional methods known from the literature for such etherification reactions can also be utilized. The tetrahydropyranyl-(2)-ether is obtained by reacting the hydroxy compounds with dihydropyran in the presence of an acidic catalyst, such as p-toluenesulfonic acid.

According to this invention, the preferred subgeneric groups of compounds are those of Formula I wherein $R_1$ to $R_5$ have the above-indicated meanings unless otherwise indicated:

(A) $R_1$ reperesents keto, $R_2$ represents methyl and additional double bonds are optionally present in the 1(2)-, 4(5)- or 5(6)-position, or in the 1(2)- and 4(5)-position, or in the 4(5)- and 6(7)-position, or in the 1(2)-, 4(5)- and 6(7)-position;

(B) $R_1$ represents αhydrogenβ$R_5$, $R_2$ represents methyl, and additional double bonds are optionally present in the 1(2)-, 2(3)-, 3(4)-, 4(5)- or 5(6)-position, or in the 2(3)- and 4(5)-position, or in the 4(5)- and 6(7)-position;

(C) $R_1$ represents keto, $R_2$ and $R_3$ represents hydrogen, and additional double bonds are optionally present in the 1(2)-, 4(5)-, 5(6)- or 5(10)-position, or in the 4(5)- and 6(7)-position, or in the 4(5)- and 9(10)-position, or in the 5(10)- and 9(11)-position, or in the 4(5)-, 5(10)- and 11(12)-position;

(D) $R_1$ represents αhydrogenβ$R_5$, $R_2$ and $R_3$ represent hydrogen, and additional double bonds are optionally present in the 1(2)-, 2(3)-, 3(4)-, 4(5)-, 5(6)-, 5(10)-position, or in the 2(3)- and 4(5)-position, or in the 2(3)- and 5(10)-position, or in the 3(4)- and 5(6)-position, or in the 3(4)- and 5(10)-position, or in the 4(5)- and 6(7)-position, or in the 4(5)- and 9(10)-position, or in the 5(10)- and 9(11)-position, or in the 4(5)-, 9(10)- and 11(12)-position;

(E) Ring A is aromatic, $R_1$ represents $R_5$ and $R_3$ represents hydrogen. Of particular importance are the more restricted groups (A) through (E) wherein $R_4$ and $R_5$ represent OH or O-lower-alkanoyl, especially O-acetyl.

The compounds of groups (A) and (B), particularly those containing either one additional double bond in the 4(5)-position or two additional double bonds in the 4(5)- and 6(7)-position exhibit chiefly progestational, anti-estrogenic, ovulation-inhibiting pregnancy-sustaining and anti-androgenic effects. The same effects can be found with the compounds of groups (C) and (D), particularly with those containing either one additional double bond in 4(5)- or 5(10)-position or two additional double bonds in 4(5)- and 6(7)-position.

The compounds of group (E), particularly those, in which $R_1$ represents hydroxy, lower alkoxy with up to 4 carbon atoms, cycloalkyloxy of 4 to 7 carbon atoms, phenoxy, benzyloxy or lower alkanoyloxy with up to 6 carbon atoms and $R_4$ represents hydroxy, lower alkoxy with up to 4 carbon atoms or lower alkanoyloxy with up to 6 carbon atoms, show mainly estrogenic, anti-fertility, ovulation-inhibiting and cholesterol-level lowering effects.

Preferred specific embodiments of this invention, not otherwise described in the examples, are as follows:

17α-cyanoethynyl-4,6-androstadien-3,on-17β-ol
6-methyl-17α-cyanoethynyl-4,6-androstadien-3-on-17β-ol
6α-methyl-17α-cyanoethynyl-4-androstene-3β,17β-diol
3β-methoxy-17α-cyanothynyl-4-androstene-17β-ol
3β-ethoxy-17α-cyanoethynyl-4-androstene-17β-ol
3β,17β-dimethoxy-17α-cyanoethynyl-4-androstene
3β,17β-diethoxy-17α-cyanoethyl-4-androstene
17α-cyanoethynyl-4,6-androstadiene-3β,17β-diol
17α-cyanoethynyl-4,6-androstadiene-3β,17β-diol-diacetate
17α-cyanoethynyl-4,6-androstadiene-3β,17β-diol-17-acetate
6-methyl-17α-cyanoethynyl-4,6-androstadiene-3β,17β-diol
3β-methoxy-17α-cyanoethynyl-4,6-androstadiene-17β-ol
3β-ethoxy-17α-cyanoethynyl-4,6-androstadiene-17β-ol
3β,17β-dimethoxy-17α-cyanoethynyl-4,6-androstadiene
3β,17β-diethoxy-17α-cyanoethynyl-4,6-androstadiene
17α-cyanoethynyl-19-nor-1-androsten-3-on-17β-ol
17α-cyanoethynyl-19-nor-5-androsten-3-on-17β-ol
17α-cyanoethynyl-17β-methoxy-19-nor-androsten-3-one
17α-cyanoethynyl-17β-ethoxy-19-nor-4-androsten-3-one
17α-cyanoethynyl-17β-methoxy-19-nor-5(10)-androsten-3-one
17α-cyanoethynyl-17β-ethoxy-19-nor-5(10)-androsten-3-one
17α-cyanoethynyl-17β-methoxy-19-nor-4,6-androstadien-3-one
17α-cyanoethynyl-17β-ethoxy-19-nor-4,6-androstadien-3-one
17α-cyanoethynyl-19-nor-1-androstene-3β,17β-diol
17α-cyanoethynyl-19-nor-5-androstene-3β,17β-diol
3β-methoxy-17α-cyanoethynyl-19-nor-4-androstene-17β-ol
3β-ethoxy-17α-cyanoethynyl-19-nor-4-androstene-17β-ol
3β,17β-dimethoxy-17α-cyanoethynyl-19-nor-4-androstene
3β,17β-diethoxy-17α-cyanoethynyl-19-nor-4-androstene
3β-methoxy-17α-cyanoethynyl-19-nor-5(10)-androstene-17β-ol
3β-ethoxy-17α-cyanoethynyl-19-nor-5(10)-androstene-17β-ol
3β,17β-dimethoxy-17α-cyanoethynyl-19-nor-5(10)-androstene
3β,17β-diethoxy-17α-cyanoethynyl-19-nor-5(10)-androstene
3β-methoxy-17α-cyanoethynyl-19-nor-4,6-androstadiene-17β-ol
3β-ethoxy-17α-cyanoethynyl-19-nor-4,6-androstadiene-17β-ol
3β,17β-dimethoxy-17α-cyanoethynyl-19-nor-4,6-androstadiene
3β,17β-diethoxy-17α-cyanoethynyl-19-nor-4,6-androstadiene
17α-cyanoethynyl-estradiol-17-acetate
17α-cyanoethynyl-estradiol-diacetate
3β,17β-dimethoxy-17α-cyanoethynyl-1,3,5(10)-estratriene
3-ethoxy-17α-cyanoethynyl-1,3,5(10)-estratrien-17β-ol
3,17β-diethoxy-17α-cyanoethynyl-1,3,5(10)-estratriene
3-n-propoxy-17α-cyanoethynyl-1,3,5(10)-estratrien-17β-ol
3-n-butoxy-17α-cyanoethynyl-1,3,5(10)-estratrien-17β-ol
3-isobutoxy-17α-cyanoethynyl-1,3,5(10)-estratrien-17β-ol
3-cyclohexyloxy-17α-cyanoethynyl-1,3,5(10)-estratrien-17β-ol
3-benzyloxy17α-cyanoethynyl-1,3,5(10)-estratrien-17β-ol
3-phenoxy-17α-cyanoethynyl-1,3,5(10)-estratrien-17β-ol The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqeous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The novel compounds are generally administered to mammals in dosages of 0.1 to 100, preferably 0.1–50, more preferably 0.5–5 mg. per dosage unit. Generally, the amount of carrier per dosage unit is about 1–5000 mg.

The antiestrogenic effect of the compounds was determined by the method of Dorfman, Kincl and Ringold, Endocrinology, volume 68, page 17 (1961). The compounds were applied orally on mice.

The progestational effect of the compounds was determined by the Clauberg test as described by McPhail, Journal of Physiology, volume 83, page 145 (1935). The compounds were applied orally or subcutaneously on rabbits.

The pregnancy-sustaining effect of the compounds was determined by the method of Stucki, Proceedings of the Society for Experimental Biology and Medicine, volume 99, page 500 (1958) on rats by applying the compounds orally or subcutaneously.

The ovulation-inhibiting effect of the compounds was determined by the method of Suchowsky et al., Arzneimittelforschung, volume 15, page 437 (1965). The compounds were applied orally on rats.

The anti-fertility effect of the compounds was determined by the method of Emmens and Martin, Journal of Reproduction and Fertility, volume 9, page 269 (1965). The compounds were applied orally on rats.

The estrogenic effect of the compounds was determined by a method similar to that described by Allen and Doisy, Journal of the American Medical Association, volume 81, page 819 (1923). The compounds were applied orally on rats.

The cholesterol-lowering effect of the compounds was determined similar to the method of Counsell et al., Journal of Medicinal and Pharmaceutical Chemistry, volume 5, page 724 (1962). The compounds were applied orally on rats.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Unless otherwise indicated, the expression THP in the following examples represents tetrahydropyranyl.

EXAMPLE 1

(a) 2 g. (4.15 millimols) of 3β,17β-bis-(tetrahydropyranyl-2-oxy)-17α-ethynyl-5-androstene (17α-ethynyl-5-androstene-3β,17β-diol-di-THP-ether) are dissolved in 20 ml. of absolute benzene and mixed, within 10 minutes under stirring with 8.25 millimols of phenylmagnesium bromide in 10 ml. of absolute ether. The temperature increases during this procedure from 10° C. to 30° C. The reaction mixture is agitated for another 5 minutes; then, 8.5 millimols of phenyl cyanate are added dropwise, the solution is boiled for 2 hours, poured into ice water, the ether-benzene phase is separated, washed alkaine, neutralized, and dried. The crude 17α-cyanoethynyl-5-androstene-3β,17β-diol-di-THP-ether is recrystallized from acetone, after being obtained by evaporation of the solution. Yield: 1 g.; M.P. 178–183° C.; $[\alpha]_D^{25}$ —201° (in chloroform).

(b) 500 mg. of the di-THP-ether obtained in accordance with (a) are dissolved in 50 ml. 95% ethanol; 2 ml. of concentrated hydrochloric acid are added, and the reaction mixture is boiled for 45 minutes. Thereafter, the solution is concentrated, and water is added until clouding occurs. After allowing the reaction mixture to stand for 3 hours at 0° C., 280 mg. of 17α-cyanoethynyl-5-androstene-3β,17β-diol are obtained, M.P. 190° C. (from diisopropyl ether); $[\alpha]_D^{25}$ —184.8° (in chloroform).

(c) 50 mg. of the diol obtained in accordance with Example 1(b) are dissolved in a small amount of pyridine, mixed with an excess of acetic anhydride and heated for a short period of time on a steam bath to 60° C. Thereafter, water is added until a precipitate is formed. After allowing the reaction mixture to stand for 12 hours at 0° C., the precipitate is vacuum-filtered, dried, and the 17α-cyanoethynyl-5-androstene-3β,17β-diol-diacetate is recrystallized from ethyl acetate/cyclohexane.

EXAMPLE 2

(a) 4 g. of 17α-ethynyl-estradiol-3,17β-di-THP-ether are dissolved in 40 ml. of absolute benzene and mixed at room temperature with 6 ml. of a 3-molar ethereal phenylmagnesium bromide solution. After 10 minutes, 2.1 g. of phenyl cyanate are added dropwise. The mixture is boiled for 3 hours, poured into 400 ml. of water, the organic phase is separated, washed with dilute solution of sodium hydroxide and water, and dried. After removal of the solvent, the oily residue is purified preparatively on silica gel plates. 17α-cyanoethynyl-estradiol-3,17β-di-THP-ether, M.P. 230–233° C. (from acetone), is obtained.

(b) 100 mg. of the THP-ether are boiled for one hour in 20 ml. of 2% methanolic hydrochloric acid. Upon the addition of water, 17α-cyanoethynyl-estradiol-(3,17β) precipitates; M.P. 205–206° C.; $[\alpha]_D^{20}$ —46.2° (dioxane).

EXAMPLE 3

At 0° C. and under an atmosphere of dry nitrogen, 150 mg. of propiolic acid nitrile are added to 500 mg. of 5-androsten-3-ol-17-one-3-THP-ether in 50 ml. anhydrous tetrahydrofuran. Then, under stirring, at 0–3° C., a solution of 330 mg. of potassium-tert.-butylate in 50 ml. tetrahydrofuran is added dropwise within 30 minutes. Then, the reaction solution is agitated for one hour at 0° C. and subsequently for one hour at 25° C. After the addition of 50 ml. of 0.5 N hydrochloric acid, the reaction mixture is stirred for another hour at 25° C. and then concentrated to half its volume; saturated sodium chloride solution is added thereto, and the reaction mixture is extracted several times with ether. The ether extract is washed neutral, dried, concentrated by evaporation, and the remaining 17α-cyanoethynyl-5-androstene-3β,17β-diol is recrystallized from diisopropyl ether, M.P. 190° C.

EXAMPLE 4

(a) In 50 ml. of liquid ammonia, 35 mg. of lithium are dissolved. There are added 640 mg. propiolaldehyde diethylacetal, and the reaction mixture is maintained for 30 minutes at —70° C. Then, a solution of 1 g. of estrone-3-THP-ether in 50 ml. tetrahydrofuran is added dropwise within one hour. Subsequently, the reaction mixture is allowed to warm up to room temperature, the solvent is removed, water and ether are added, the reaction mixture separated, the ether phase dried with sodium sulfate, and, after the ether has been evaporated, there is obtained 17α-(3,3-diethoxy-1-propinyl)-estradiol-3-THP-ether.

(b) 500 mg. of crude 17α-(3,3-diethoxyl-1-propinyl)-estradiol-3-THP-ether are allowed to stand for 12 hours at 25° C. in 50 ml. 5% methanolic hydrochloric acid. Thereafter, 50 ml. of water are added, the solution is concentrated to half its volume, and several times extracted with ether. The reaction solution is washed neutral, dried, the ether is removed, and there is thus obtained 17α-formyl-ethynyl-estradiol.

(c) To a solution of 650 mg. of 17α-formyl-ethynyl-estradiol in 50 ml. ethanol, there are added 160 mg. hydroxyl-amine-hydrochloride and 100 mg. sodium hydroxide, dissolved each in 5 ml. of water. The mixture is allowed to stand for 16 hours at room temperature, then poured in about 200 ml. of water, and the oxime pertaining thereto is obtained therefrom by extraction with chloroform.

(d) The crude 17α-formyl-ethynyl-estradiol-oxime obtained in accordance with the above is dissolved in 50 ml. of acetic anhydride, the solution is slowly heated to the boiling point and boiled for one-half hour. Then, the reaction mixture is allowed to cool, is poured into 100 ml. of 1 N sodium hydroxide solution, extracted with ether, washed neutral, dried, and there is thus obtained, after the ether has been removed by evaporation, 17α-cyanoethynyl-estradiol.

(e) 360 mg. of 17α-formyl-ethynyl-estradiol-3-acetate, obtained by reacting 17α-formyl-ethynyl-estradiol with acetic anhydride in pyridine for 3 hours, are dissolved in 50 ml. of absolute benzene, together with 225 mg. of N,O-bis-(trifluoroacetyl)-hydroxylamine. There are added 2 ml. of pyridine, and the mixture is boiled for two hours. Thereafter, the solution is washed successively with dilute solution of sodium hydroxide, dilute hydrochloric acid, and several times with water, dried over sodium sulfate, and the solvent is removed under reduced pressure. As the residue, 17α-cyanoethynyl-estradiol-(3,17β) is obtained, M.P. 205–206° C.; $[\alpha]_D^{20}$ —46.2° (dioxane).

EXAMPLE 5

(a) In 100 ml. of benzene, 1.3 g. 3-methoxy-17β-(tetrahydropyranyl-2-oxy)-17α-ethynyl-estradiol are dissolved and mixed, at 25–30° C., with 6.5 ml. of a 20% butyl lithium solution. During the course of one-half hour, 5.2 g. chlorocyan are introduced into this solution. Thereafter, the solution is first maintained for 3 hours at 70° C. and then for a further 12 hours at 25° C.

After removal of the solvent, 1.8 g. of a slightly yellow, amorphous mass are obtained, the analytical and spectral properties thereof being in accord with 17α-cyanoethynyl-3-methoxy-estradiol-17β-THP-ether.

Without conducting any further working-up steps, this amount of 1.8 g. is dissolved in 60 ml. of ethanol and 5 ml. of 37% hydrochloric acid and maintained for two hours at 25° C. After the addition of 200 ml. H₂O, the reaction solution is shaken out twice with 80 ml. portions of ether. The organic phase is washed with sodium hydrogen carbonate and with water, and dried over sodium sulfate; the ether is removed under reduced pressure. A residue (1.5 g.) is obtained which crystallizes from hexane/ether 3:1. A repeated recrystallization from hexane results in 0.6 g. of 3-methoxy-17α-cyanoethynyl-1,3,5 (10)-estratrien-17α-ol; M.P. 142–143° C.; $[\alpha]_D^{20}$ —45.4° (chloroform).

Analogously, the following compounds are produced:

17α-cyanoethynyl-5α-2-androsten-17β-ol, M.P. 210–211° C.; $[\alpha]_D^{20}$ −26.6° (chloroform);
3-cyclopentyloxy-17α-cyanoethynyl-1,3,5(10)-estratriene-17β-ol, M.P. 150–151° C. (hexane); and
17α-cyanoethynyl-19-nor-4-androsten-17β-ol.

(b) Analogously to Example 1(c), the 3-methoxy-17α-cyanoethynyl-1,3,5(10)-estratrien-17β-ol obtained according to Example 5(a) is converted into the corresponding 17-acetate.

EXAMPLE 6

(a) 8.5 g. of 3-ethylenedioxy-17α-ethynyl-17β-hydroxy-19-nor-5-androstene are dissolved in 85 ml. of tetrahydrofuran and 35 ml. of dihydropyran. Then there is added 1 ml. of phosphorus oxytrichloride, and the reaction mixture is allowed to stand for 1 hour at 28° C. Thereafter, 10 ml. of pyridine are added, and the solvents are removed under reduced pressure. There are obtained 12.5 g. of the corresponding 17β-tetrahydropyranyl-ether. No hydroxy and keto bands occur any more in the infrared spectrum.

The thus-obtained product is reacted with chlorocyan analogously to Example 5(a). During the acidic hydrolysis, the 3-ketal- and the 17α-tetrahydropyranyl-ether splitting reactions take place side-by-side. The thus-obtained crude product is chromatographed on 150 g. of silica gel with benzene as the elution agent and recrystallized from ether. There is obtained 17α-cyanoethynyl-19-nor - 4 - androsten-3-on-17β-ol (17α-cyanoethynyl-19-nor-testosterone), having the melting point of 148–149° C.

(b) The compound obtained in accordance with Example 6(a) is converted into 17α-cyanoethynyl-19-nor-testosterone-acetate analogously to Example 1(c) by treatment with acetic anhydride in pyridine.

Analogously, the following compounds are obtained after conversion of the starting products into the tetrahydropyranyl-ethers and subsequent reaction with chlorocyan:

17α-cyanoethynyl-testosterone, and
17α-cyanoethynyl-19-nor-5(10)-androsten-3-on-17β-ol.

The thus-obtained compounds are converted, analogously to Example 1(d), into the acetates pertaining thereto, e.g., into 17α-cyanoethynyl-testosterone-acetate.

EXAMPLE 7

(a) Analogously to Example 6(a), 17α-cyanoethynyl-5-androsten-3-on-17β-ol, is produced from 3-ethylenedioxy - 17α - ethynyl - 17β - hydroxy - 5 - androstene - 17β-THP-ether.

(b) The alcohol obtained according to Example 7(a) is converted, analogously to Example 1(c), into 17α-cyanoethynyl-5-androsten-3-on-17α - ol - acetate by treatment with acetic anhydride in pyridine.

EXAMPLE 8

(a) Analogously to Examples 1(a) and (b), the following 17α-cyanoethynyl compounds are produced by reacting the corresponding THP-ethers with phenylcyanate:

17α-cyanoethynyl-4-androstene-3β,17β-diol;
17α-cyanoethynyl-19-nor-5(10)-androstene-3β,17β-diol;
17α-cyanoethynyl-19-nor-4,6-androstadiene-3β,17β-diol;
17α-cyanoethynyl-19-nor-5(10),9(11)-androstadiene-3β,17β-diol;
3-methoxy-17α-cyanoethynyl-19-nor-2,5(10)-androstadien-17β-ol.

(b) Analogously to Example 1(c), by conventional esterification, the corresponding acetates are obtained, e.g., 17α-cyanoethynyl-4-androstene-3β,17β-diol-diacetate.

(c) The diacetate produced according to Example 8(b) can be converted, by partial hydrolysis with an aqueous sodium hydrogen carbonate solution at −10° C. into 17α-cyanoethynyl-4-androstene-3β,17β-diol-17-acetate.

EXAMPLE 9

Employing the corresponding 3-ethylene-ketals as the starting materials, the following compounds are obtained, analogously to Example 6:

17α-cyanoethynyl-19-nor-4,6-androstadien-3-on-17β-ol;
17α-cyanoethynyl-19-nor-4,9-androstadien-3-on-17β-ol;
17α-cyanoethynyl-19-nor-4,9,11-androstatrien-3-on-17β-ol;
17α-cyanoethynyl-19-nor-5(10),9(11)-androstadien-3-one;
17α-cyanoethynyl-19-nor-2-androsten-3-on-17β-ol.

EXAMPLE 10

3.5 g. of 17α-cyanoethynyl-estradiol and 3.6 g. of sulfamic acid are added with stirring to 14 ml. of absolute pyridine at 90° C. After stirring for 3 hours at this temperature, the reaction mixture is cooled, mixed with 100 ml. of absolute ether, and vigorously agitated. The solution is decanted from the precipitate; the latter is washed with a small amount of ether, dried, mixed with 45 ml. of 12% aqueous sodium hydroxide solution and 30 ml. of pyridine, and well shaken. The (upper) pyridine layer is separated and washed several times with ether. The separated oil is dried, taken up in methanol, and briefly treated with charcoal. From the filtrate, the sodium salt of 17α-cyanoethynyl-estradiol-3-sulfate is precipitated by addition of ether.

The following examples include pharmaceutical compositions of the novel compounds:

Example A.—Tablets

Each tablet contains—

| | Mg. |
|---|---|
| 3 - methoxy - 17α - cyanoethynyl - 1,3,5(10) - estratrien - 17β - ol | 2 |
| Lactose | 70 |
| Corn starch | 26 |
| Magnesium stearate | 2 |

Example B.—Coated tablets

Each tablet contains—

| | Mg. |
|---|---|
| 17α-cyanoethynyl-estradiol | 3 |
| Lactose | 80 |
| Potato starch | 15 |
| Talc | 2 |

The coating (150 mg.) is a conventional mixture of corn starch, sugar, talc, and tragacanth.

Example C.—Solution for injection

A solution of 200 g. of 17α-cyanoethynyl-estradiol-diacetate in 99.8 kg. of sesame oil is prepared and filled into ampoules in such a manner that each ampoule contains 2 mg. of the drug.

Example D.—Syrup

A mixture of—

| | Kg. |
|---|---|
| 17α-cyanoethynyl-estradiol-3-sulfate, sodium salt | 0.2 |
| Glycerol (twice distilled) | 7.5 |
| Cane sugar | 56.0 |
| Methyl p-hydroxybenzoate | 0.07 |
| N-propyl-p-hydroxybenzoate | 0.03 |
| Ethanol | 10.0 |
| Fruit flavorings | As desired |

Is prepared and mixed with distilled water in such a manner that the volume of the entire preparation is 100 l. A dosage unit (5 ml.) contains 10 mg. of active substance.

Instead of the compounds named other compounds covered by Formula I can be incorporated into similar compositions.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A steroid selected from the group consisting of the androstane and 19-nor-androstane series, said steroid having a free, esterified, or etherified 17α-OH group, and a 17α-cyanoethynyl group.

2. A steroid as defined by claim 1 wherein said steroid is selected from the group consisting of:

17α-cyanoethynyl-5-androstene-3β,17β-diol;
17α-cyanoethynyl-5-androstene-3β,17β-diol-diacetate;
17α-cyanoethynyl-5-androsten-3-on-17β-ol;
17α-cyanoethynyl-5-androsten-3-on-17β-ol-acetate;
17α-cyanoethynyl-testosterone;
17α-cyanoethynyl-testosterone-acetate;
17α-cyanoethynyl-4-androstene-3β,17β-diol;
17α-cyanoethynyl-4-androstene-3β,17β-diol-diacetate;
17α-cyanoethynyl-4-androstene-3β,17β-diol-17-acetate;
17α-cyanoethynyl-19-nor-testosterone;
17α-cyanoethynyl-19-nor-testosterone-acetate;
17α-cyanoethynyl-19-nor-5(10)-androsten-3-on-17β-ol;
17α-cyanoethynyl-19-nor-5(10)-androstene-3β,17β-diol;
17α-cyanoethynyl-19-nor-4-androsten-17β-ol;
17α-cyanoethynyl-19-nor-2-androsten-3-on-17β-ol;
17α-cyanoethynyl-19-nor-4,6-androstadien-3-on-17β-ol;
17α-cyanoethynyl-19-nor-4,6-androstadiene-3β,17β-diol;
17α-cyanoethynyl-estradiol;
3-methoxy-17α-cyanoethynyl-1,3,5(10)-estratrien-17β-ol;
3-methoxy-17α-cyanoethynyl-1,3,5(10)-estratrien-17β-ol-17-acetate;
17α-cyanoethynyl-19-nor-4,9-androstadien-3-on-17β-ol;
17α-cyanoethynyl-19-nor-4,9,11-androstatrien-3-on-17β-ol;
17α-cyanoethynyl-19-nor-5(10),9(11)-androstadien-3-on-17β-ol;
17α-cyanoethynyl-19-nor-5(10),9(11)-androstadiene-3β,17β-diol;
17α-cyanoethynyl-2-androsten-17β-ol;
3-methoxy-17α-cyanoethynyl-19-nor-2,5(10)-androstadien-17β-ol; and
3-cyclopentyloxy-17α-cyanoethynyl-1,3,5(10)-estratrien-17β-ol.

3. 17α-cyanoethynyl-19-nor-testosterone, a species of claim 1.

4. 17α - cyanoethynyl - 19 - nor - 5(10),9(11) - androstadien-3-on-17β-ol, a species of claim 1.

5. 17α - cyanoethynyl - 19 - nor - 4,9 - androstadien - 3-on 17β-ol, a species of claim 1.

6. 17α - cyanoethynyl - 19 - nor - 4,9,11 - androstatrien-3-on-17β-ol, a species of claim 1.

No references cited.

U.S. Cl. X.R.

260—239.55, 397.5 397.45; 424—243